United States Patent
Terunuma et al.

(10) Patent No.: US 6,188,543 B1
(45) Date of Patent: Feb. 13, 2001

(54) THIN FILM MAGNETIC HEAD

(75) Inventors: Koichi Terunuma, Tokyo; Yasufumi Uno, Nagano; Tetsuya Mino, Chiba; Koji Matsukuma, Hyogo, all of (JP)

(73) Assignee: TDK Corporation, Tokyo (JP)

( * ) Notice: Under 35 U.S.C. 154(b), the term of this patent shall be extended for 0 days.

(21) Appl. No.: 09/063,791

(22) Filed: Apr. 22, 1998

(30) Foreign Application Priority Data

May 16, 1997 (JP) .................................................. 9-141105

(51) Int. Cl.$^7$ ....................................................... G11B 5/31
(52) U.S. Cl. .................................................................. 360/126
(58) Field of Search ................................. 360/122, 125, 360/126

(56) References Cited

U.S. PATENT DOCUMENTS 5,585,984  12/1996  Hasegawa et al. ................... 360/119

FOREIGN PATENT DOCUMENTS 62-287410 * 12/1987 (JP) .
3-109703 * 5/1991 (JP) .
8-3883 1/1996 (JP) .

* cited by examiner

Primary Examiner—Brian E. Miller
(74) Attorney, Agent, or Firm—Arent Fox Kintner Plotkin & Kahn PLLC

(57) ABSTRACT

A thin film magnetic head includes a recording gap layer, and lower and upper magnetic pole layers made of polycrystalline magnetic substances, deposited to sandwich the recording gap layer. An average particle size D of crystal substances at least in a region of the upper magnetic pole layer, near the recording gap layer with respect to a recording track width W is set to $D \leq W/20$.

25 Claims, 2 Drawing Sheets

THIN FILM MAGNETIC HEAD

FIELD OF THE INVENTION

The present invention relates to a thin film magnetic head with a recording track width capable of higher recording density in magnetic media such as magnetic disks.

DESCRIPTION OF THE RELATED ART

Due to the recent demand for higher recording density in the magnetic media, the recording track width of the thin film magnetic head is becoming increasingly narrower. In the near future, a thin film head with a recording track width of a submicron (equal to or less than one micrometer) order will be certainly requested.

In general, magnetic pole layers in a thin film magnetic recording head are made of polycrystal magnetic material such as NiFe. This polycrystalline substance includes many micro monocrystal substances with various crystal orientations. Therefore, if the recording track width is wide enough in comparison with the size of the each monocrystal substance, magnetic characteristics of the recording head will not be influenced by the crystal orientation of each monocrystal substance.

However, when the recording track width is of a submicron order, the size of the monocrystal magnetic substance cannot be negligible. Namely, the magnetic characteristics of the recording head will be greatly influenced by the magnetization direction due to the crystal orientation of each monocrystal magnetic substance and thus variations in the recording capability of the head will occur.

SUMMARY OF THE INVENTION

It is therefore an object of the present invention to provide a thin film magnetic head, whereby a stable recording capability can be realized even when its recording track width is very narrow.

The present invention relates to a thin film magnetic head including a recording gap layer, and lower and upper magnetic pole layers made of polycrystalline magnetic substances, deposited to sandwich the recording gap layer. Particularly, according to the present invention, an average particle size D of crystal substances in a least a region of the upper magnetic pole layer, near the recording gap layer with respect to a recording track width W is set to $D \leq W/20$.

The average particle size D in the magnetic pole portion which actually concerns the magnetic recording operation becomes smaller in accordance with the narrowing of the recording track width W, and thus the number of crystals aligned between the track width will not be so small. As a result, variations in the magnetic characteristics due to the crystal orientation of each monocrystal magnetic substance can be dispersed, and thus variations in the recording capability of the head can be prevented from occurring.

In one embodiment, an average particle size D of crystal substances in at least a region of the lower magnetic pole layer, near the recording gap layer with respect to the recording track width W also may be set to $D \leq W/20$.

In another embodiment, an average particle size D of crystal substances only in a region of the upper magnetic pole layer, near the recording gap layer with respect to a recording track width W may be set to $D \leq W/20$. In a further embodiment, an average particle size D of crystal substances in all regions of the upper magnetic pole layer with respect to the recording track width W may be set to $D \leq W/20$.

An average particle size D of crystal substances in all regions of the lower magnetic pole layer with respect to the recording track width W may be set to $D \leq W/20$.

In most cases, the recording track width W is set to $W \leq 1.5 \, \mu m$.

Further objects and advantages of the present invention will be apparent from the following description of the preferred embodiments of the invention as illustrated in the accompanying drawings.

DESCRIPTION OF THE PREFERRED EMBODIMENTS

Figure 1:
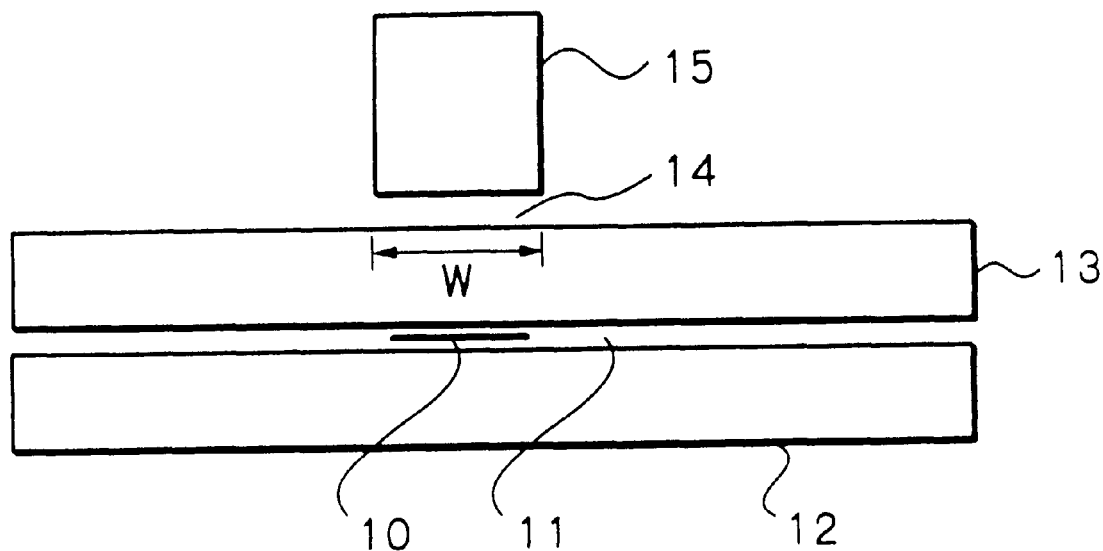
FIG. 1 shows a sectional view for schematically illustrating a multilayered structure of a preferred embodiment of a thin film magnetic head according to the present invention.

FIG. 1 schematically illustrates the multilayered structure of a preferred embodiment of the thin film magnetic head according to the present invention. In this embodiment, the thin film magnetic head is a composite type thin film magnetic head formed by integrating an inductive recording head part and a magnetoresistive (MR) reproducing head part.

In the figure, reference numeral 10 denotes a MR element of the MR head part, 11 denotes an insulating layer surrounding the MR element 10, 12 denotes a lower shielding layer for the MR element 10, 13 denotes an upper shielding layer for the MR element 10 and lower magnetic pole layer for the inductive head part, 14 denotes a recording gap layer, and 15 denotes an upper magnetic pole layer for the inductive head part, respectively.

As a multilayered structure of a composite type thin film magnetic head is well-known in this technical field, detailed description of each layer is omitted in the specification.

In this embodiment, the lower shielding layer 12, the lower magnetic pole layer (upper shielding layer) 13 and the upper magnetic pole layer 15 are plated layers made of polycrystalline magnetic material 20 such as NiFe.

Instead of NiFe, these layers 12, 13 and 15 can be formed by plated layers made of another polycrystalline magnetic material 20 of, for example, Fe—Co, Fe—M where M is selected from one of N, C, B, Si, Al, Ti, Zr, Ta, Hf, Mo and Nb, Fe—Co—M where M is selected at least one of N, C, B, Si, Al, Ti, Zr, Ta, Hf, Mo and Nb, Fe—Co amorphous, Fe—M—N where M is selected from one of N, C, B, Si, Al, Ti, Zr, Ta, Hf, Mo and Nb, Fe—M—O where M is selected from one of N, C, B, Si, Al, Ti, Zr, Ta, Hf, Mo and Nb, Fe—Co—M—N where M is selected from one of N, C, B, Si, Al, Ti, Zr, Ta, Hf, Mo and Nb, or Fe—Co—N.

According to this embodiment, an average particle size D of the polycrystal magnetic substances in a region of the upper magnetic pole layer 15, which is located in contact with or close to the recording gap layer 14, is set to $D \leq W/20$, where W is a recording track width. In other words, this region of the magnetic pole layer 15 is formed by the polycrystalline magnetic material 20 with the average particle size of $D \leq W/20$.

Figure 2:
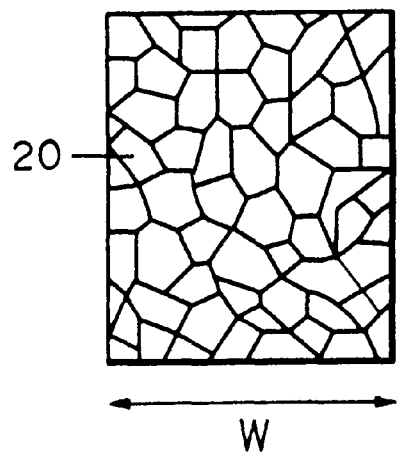
FIG. 2 illustrates a relationship between particle sizes of monocrystal magnetic substances and a recording track width w.

As shown in FIG. 2, polycrystalline magnetic material 20 such as NiFe is constituted by many coupled monocrystal substances with different particle sizes. In case of a recording track width of W=1.0 μm, the average particle size D is defined to D≦1.0 μm/20=0.05 μm (500 Angstroms) according to the present invention. Therefore, in the region of the upper magnetic pole layer 15, which region is located in contact with or close to the recording gap layer 14 and thus is actually concerned with the magnetic recording operation, twenty or more monocrystal magnetic substances will be aligned along the direction of the track width W. As a result, variations in the magnetic characteristics due to the crystal orientation of each monocrystal magnetic substance can be dispersed, and thus variations in the recoding capability of the head can be prevented from occurring.

Figure 3:
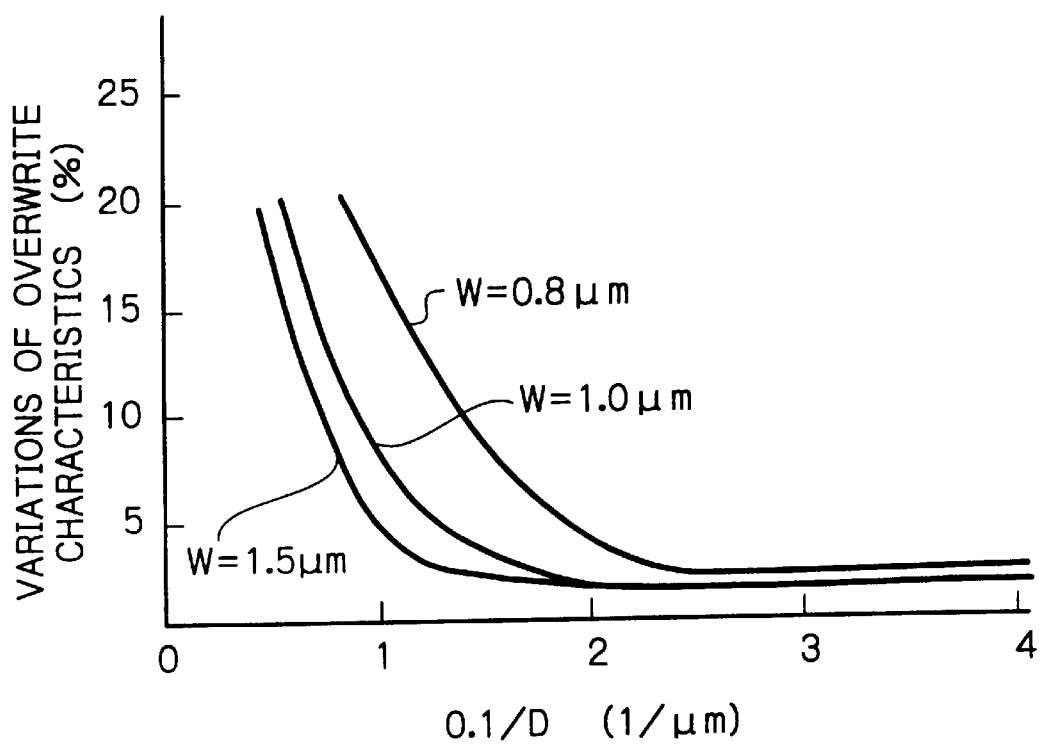
FIG. 3 graphically shows recording characteristics of magnetic head according to the present invention with respect to an average particle size of polycrystal substances in magnetic pole layers of the head.

FIG. 3 shows data of recording characteristics of the magnetic head with respect to an average particle size of the polycrystal substance in magnetic pole layers of the head using the recording track widths W as parameters. In the figure, the horizontal axis indicates 0.1/D where D is the average particle size with a unit of μm, and the vertical axis indicates variations of overwrite characteristics of the recording head. The overwrite characteristic is a well-known electromagnetic characteristic representing the recording capability of a magnetic head. This overwrite characteristic can be obtained by writing LF (Low Frequency) data on the tracks of a magnetic medium, and by measuring attenuation of the LF data when HF (High Frequency) data is written on the same tracks without DC erasing the LF data. The vertical axis therefore represents variations of recording capability of the magnetic head. As for parameters, W=1.5 μm, 1.0 μm and 0.8 μm are provided.

In the measurement, the plated NiFe magnetic pole layers with different average particle sizes were formed by changing the plating conditions and heat treatment conditions. With respect to recording heads with these magnetic pole layers respectively, overwrite characteristics were measured using the magnetic media of 25000 e and 80 G μ. To reproduce the recorded data in the magnetic medium, a MR element with a reproducing track width of 0.5 μm, which is narrower than the recording track width W, was used.

As will be apparent from FIG. 3, when the recording track width of W=1.5 μm, if 0.1/D is equal to or higher than about 1.3, the overwrite characteristic variations are substantially saturated at a lower level. This saturated region corresponds to a region in which the average particle size of D≦0.075 μm (=1.5 μm/20). When the recording track width of W=1.0 μm, if 0.1/D is equal to or higher than about 2.0, the overwrite characteristic variations are substantially saturated at a lower level. This saturated region corresponds to a region in which the average particle size of D≦0.05 μm (=1.0 μm/20). When the recording track width of W=0.8 μm, if 0.1/D is equal to or higher than about 2.5, the overwrite characteristic variations are substantially saturated at a lower level. This saturated region corresponds to a region in which the average particle size of D≦0.04 μm (=0.8 μm/20).

Since the average particle size D of the polycrystal magnetic substances with respect to the recording track width W of the magnetic head is set D≦W/20, according to the present invention, variations of the overwrite characteristic therefore variations of recording capability of the magnetic head can be reduced and thus stable recording performance can be obtained even if the recording track width becomes extremely narrow as to submicron order.

In the aforementioned embodiment, the average particle size D of the polycrystal magnetic substances only in the region located in contact with or close to the recording gap layer 14, of the upper magnetic pole layer 15, is set to D≦W/20. However, according to the present invention, the average particle size D of the polycrystal magnetic substances in all the upper magnetic pole layer 15 may be set to D≦W/20.

It is important to consider the average particle size D of the polycrystal magnetic substances, particularly in the upper magnetic pole layer 15. This is because recorded magnetic patterns formed on the magnetic medium are determined depending upon magnetic characteristics of the upper magnetic pole layer 15, and, particularly in the composite type magnetic head, the width of the lower magnetic pole layer 13 is wider than that of the upper magnetic pole layer 15 and therefore, the larger particle size of the magnetic substances in this lower magnetic pole layer 13 will not so influence variations in the overwrite characteristics of the head.

However, not only can the average particle size D of the polycrystal magnetic substances in the region located in contact with or close to the recording gap layer 14, of the lower magnetic pole layer 13, be set to D≦W/20, but also the average particle size D of the polycrystal magnetic substances in all the lower magnetic pole layer 13 can be set to D≦W/20.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thin film magnetic head with an inductive recording head element and a magnetoresistive recording head element, said inductive recording head element comprising:
   a recording gap layer; and
   lower and upper magnetic pole layers made of polycrystalline magnetic substances, deposited to sandwich said recording gap layer, said polycrystalline magnetic substances having plural monocrystal magnetic substances and consisting of NiFe,
   said polycrystalline magnetic substances in a region of said upper magnetic pole layer, near said recording gap layer having an average particle size D equivalent to D≦W/20, where W is the recording track width, so as to disperse variations in the magnetic characteristics due to the crystal orientation of each monocrystal magnetic substance.

2. The thin film magnetic head as claimed in claim 1, wherein said polycrystalline magnetic substances in a region of said lower magnetic pole layer, near said recording gap layer also have an average particle size D equivalent to D≦W/20.

3. The thin film magnetic head as claimed in claim 1, wherein said polycrystalline magnetic substances in all regions of said upper magnetic pole layer near said recording gap layer have an average particle size D equivalent to D≦W/20.

4. The thin film magnetic head as claimed in claim 1, wherein said polycrystalline magnetic substances in all regions of said lower magnetic pole layer also have an average particle size D equivalent to D≦W/20.

5. The thin film magnetic head as claimed in claim 1, wherein the recording track width W is set to W≦1.5 μm.

6. A thin film magnetic head with an inductive recording head element and a magnetoresistive reproducing head element, said inductive recording head comprising:
   a recording gap layer; and
   lower and upper magnetic pole layers made of polycrystalline magnetic substances, deposited to sandwich said recording gap layer, said polycrystalline magnetic substances having plural monocrystal magnetic substances and consisting of Fe—M where M is selected from at least one of N, C, B, Si, Al, Ti, Zr, Ta, Hf, Mo and Nb, said polycrystalline magnetic substances in a region of said upper magnetic pole layer, near said recording gap layer having an average particle size D equivalent to $D \leq W/20$, where W is the recording track width, so as to disperse variations in the magnetic characteristics due to the crystal orientation of each monocrystal magnetic substance.

7. The thin film magnetic head as claimed in claim 6, wherein said polycrystalline magnetic substances in a region of said lower magnetic pole layer, near said recording gap layer also have an average particle size D equivalent to $D \leq W/20$.

8. The thin film magnetic head as claimed in claim 6, wherein said polycrystalline magnetic substances in all regions of said upper magnetic pole layer, near said recording gap layer have an average particle size D equivalent to $D \leq W/20$.

9. The thin film magnetic head as claimed in claim 6, wherein said polycrystalline magnetic substances in all regions of said lower magnetic pole layer, near said recording gap layer also have an average particle size D equivalent to $D \leq W/20$.

10. A thin film magnetic head with an inductive recording head element and a magnetoresistive reproducing head element, said inductive recording head comprising:

a recording gap layer; and lower and upper magnetic pole layers made of polycrystalline magnetic substances, deposited to sandwich said recording gap layer, said polycrystalline magnetic substances having plural monocrystal magnetic substances and consisting of Fe—Co—M where M is selected from at least one of N, C, B, Si, Al, Ti, Zr, Ta, Hf, Mo and Nb, said polycrystalline magnetic substances in a region of said upper magnetic pole layer, near said recording gap having an average particle size D equivalent to $D \leq W/20$, where W is the recording track width, so as to disperse variations in the magnetic characteristics due to the crystal orientation of each monocrystal magnetic substance.

11. The thin film magnetic head as claimed in claim 10, wherein said polycrystalline magnetic substances in a region of said lower magnetic pole layer, near said recording gap layer also have an average particle size D equivalent to $D \leq W/20$.

12. The thin film magnetic head as claimed in claim 10, wherein said polycrystalline magnetic substances in all regions of said upper magnetic pole layer, near said recording gap layer have an average particle size D equivalent to $D \leq W/20$.

13. The thin film magnetic head as claimed in claim 10, wherein said polycrystalline magnetic substances in all regions of said lower magnetic pole layer, near said recording gap layer also have an average particle size D equivalent to $D \leq W/20$.

14. A thin film magnetic head with an inductive recording head element and a magnetoresistive reproducing head element, said inductive recording head comprising:

a recording gap layer; and lower and upper magnetic pole layers made of polycrystalline magnetic substances, deposited to sandwich said recording gap layer, said polycrystalline magnetic substances having plural monocrystal magnetic substances and consisting of Fe—M—N where M is selected from at least one of N, C, B, Si, Al, Ti, Zr, Ta, Hf, Mo and Nb, said polycrystalline magnetic substances in a region of said upper magnetic pole layer, near said recording gap layer having an average particle size D equivalent to $D \leq W/20$, where W is the recording track width, so as to disperse variations in the magnetic characteristics due to the crystal orientation of each monocrystal magnetic substance.

15. The thin film magnetic head as claimed in claim 14, wherein said polycrystalline magnetic substances in a region of said lower magnetic pole layer, near said recording gap layer also have an average particle size D equivalent to $D \leq W/20$.

16. The thin film magnetic head as claimed in claim 14, wherein said polycrystalline magnetic substances in all regions of said upper magnetic pole layer, near said recording gap layer have an average particle size D equivalent to $D \leq W/20$.

17. The thin film magnetic head as claimed in claim 14, wherein said polycrystalline magnetic substances in all regions of said lower magnetic pole layer, near said recording gap layer also have an average particle size D equivalent to $D \leq W/20$.

18. A thin film magnetic head with an inductive recording head element and a magnetoresistive reproducing head element, said inductive recording head comprising:

a recording gap layer; and lower and upper magnetic pole layers made of polycrystalline magnetic substances, deposited to sandwich said recording gap layer, said polycrystalline magnetic substances having plural monocrystal magnetic substances and consisting of Fe—M—O where M is selected from at least one of N, C, B, Si, Al, Ti, Zr, Ta, Hf, Mo and Nb, said polycrystalline magnetic substances in a region of said upper magnetic pole layer, near said recording gap layer having an average particle size D equivalent to $D \leq W/20$, where W is the recording track width, so as to disperse variations in the magnetic characteristics due to the crystal orientation of each monocrystal magnetic substance.

19. The thin film magnetic head as claimed in claim 18, wherein said polycrystalline magnetic substances in a region of said lower magnetic pole layer, near said recording gap layer also have an average particle size D equivalent to $D \leq W/20$.

20. The thin film magnetic head as claimed in claim 18, wherein said polycrystalline magnetic substances in all regions of said upper magnetic pole layer, near said recording gap layer have an average particle size D equivalent to $D \leq W/20$.

21. The thin film magnetic head as claimed in claim 18, wherein said polycrystalline magnetic substances in all regions of said lower magnetic pole layer, near said recording gap layer also have an average particle size D equivalent to $D \leq W/20$.

22. A thin film magnetic head with an inductive recording head element and a magnetoresistive reproducing head element, said inductive recording head comprising:

a recording gap layer; and lower and upper magnetic pole layers made of polycrystalline magnetic substances, deposited to sandwich said recording gap layer, said polycrystalline magnetic substances having plural monocrystal magnetic substances and consisting of Fe—Co—M—N where M is selected from at least one of C, B, Si, Al, Ti, Zr, Ta, Hf, Mo and Nb, said polycrystalline magnetic substances in a region of said upper magnetic pole layer, near said recording gap layer having an average particle size D equivalent to $D \leq W/20$, where W is the recording track width, so as to disperse variations in the magnetic characteristics due to the crystal orientation of each monocrystal magnetic substance.

23. The thin film magnetic head as claimed in claim 22, wherein said polycrystalline magnetic substances in a region of said lower magnetic pole layer, near said recording gap layer also have an average particle size D equivalent to $D \leq W/20$.

24. The thin film magnetic head as claimed in claim 22, wherein said polycrystalline magnetic substances in all regions of said upper magnetic pole layer, near said recording gap layer have an average particle size D equivalent to $D \leq W/20$.

25. The thin film magnetic head as claimed in claim 22, wherein said polycrystalline magnetic substances in all regions of said lower magnetic pole layer, near said recording gap layer also have an average particle size D equivalent to $D \leq W/20$.

* * * * *